Feb. 26, 1946.  H. M. STOLLER  2,395,515
FREQUENCY DETECTING NETWORK
Filed Nov. 21, 1942  2 Sheets-Sheet 1
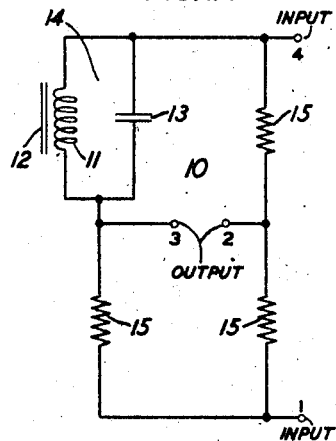
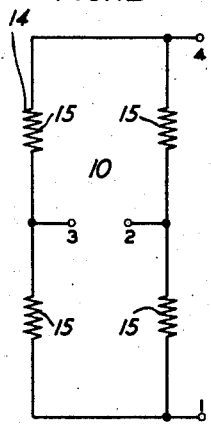
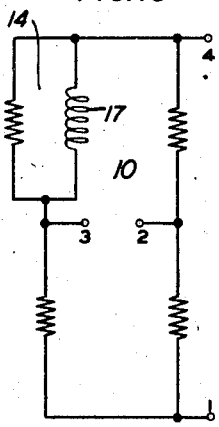
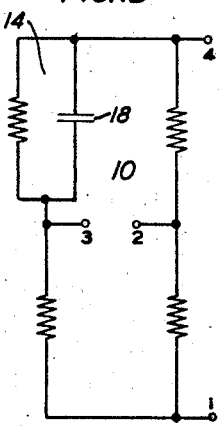
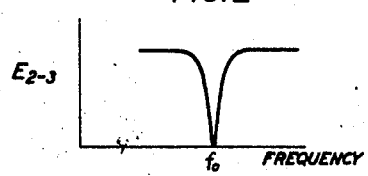
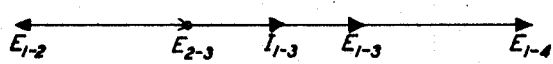
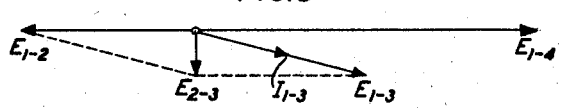
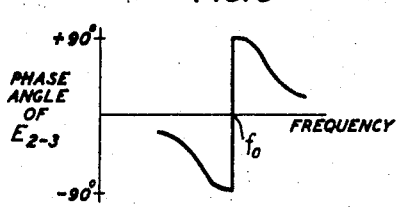
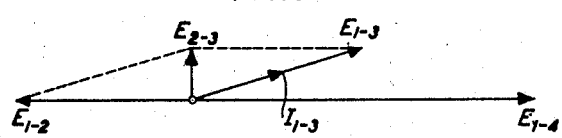
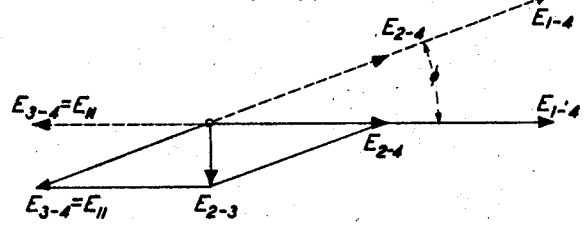
INVENTOR
H. M. STOLLER
BY
*H. A. Burgess*
ATTORNEY Feb. 26, 1946.     H. M. STOLLER     2,395,515
FREQUENCY DETECTING NETWORK
Filed Nov. 21, 1942     2 Sheets-Sheet 2

INVENTOR
H. M. STOLLER
BY
*H. A. Burgess*
ATTORNEY

Patented Feb. 26, 1946

2,395,515

UNITED STATES PATENT OFFICE 2,395,515

FREQUENCY DETECTING NETWORK

Hugh M. Stoller, Mountain Lakes, N. J., assignor to Bell Telephone Laboratories, Incorporated, New York, N. Y., a corporation of New York Application November 21, 1942, Serial No. 466,507

5 Claims. (Cl. 171—119)

This invention relates to an electrical network for detecting changes in a characteristic of an electrical wave, and more particularly to a bridge network including a resonant arm tuned to a certain frequency for detecting changes in the frequency of an alternating wave applied to the input of the bridge network, with reference to the certain frequency. Such frequency bridges may be employed, for example, in speed control circuits, servo-mechanisms, tracking systems, and timing systems.

Heretofore, bridge networks were known in regulator systems for the purpose of detecting changes in the frequency of an alternating wave relative to a certain frequency to control the electrical energy supplied to an electrical motor whereby its speed could be regulated. Such bridge networks were of the Wheatstone bridge type embodying four physical arms, one of which comprised an electrical winding and capacity tuned to the certain frequency. Certain prior art circuits disclosing such bridge networks in speed regulator systems are disclosed, for example, in my Patents Nos. 1,695,035 and 1,711,661 granted December 11, 1928 and May 7, 1929, respectively. These systems were used in cases where the factors of bulk, weight and ambient temperature variations were of no special concern. The present invention is particularly applicable to situations where the factors of space, weight and ambient temperature variations are of paramount importance, such as in the field of mobile apparatus.

The present invention contemplates a frequency discriminating bridge network adapted to detect variations in the frequency of an electrical wave with respect to a certain frequency; to provide an increased output for a given percentage variation in frequency; to accomplish the detection of such frequency discrimination with compensation for variations of ambient temperature; and to provide such bridge network with substantially minimum bulk and weight characteristics.

The main object is to provide frequency discriminating apparatus of simplified or improved construction which produces a transient voltage in response to a sudden change in the phase of the reference voltage, which transient voltage is in phase with the steady state output voltage of the apparatus.

Another object is to provide frequency discriminating apparatus which may be expeditiously adjusted to precise balance during manufacture.

A frequency discriminating network of the type mentioned above as known to the prior art comprises a Wheatstone bridge in which one arm is a resonant circuit tuned to a certain frequency and in which the other three arms are equal resistors. When an alternating current of the certain frequency is applied to the bridge input terminals, the resonant arm becomes effectively a resistor equal in resistance value to the resistance value of each of the other three bridge arms so that no output alternating current appears at the bridge output terminals. When an alternating current of a frequency below the certain frequency is applied to the bridge input terminals, the resonant arm becomes effectively an inductance so that an alternating current is produced at the bridge output terminals in such sense as to lag in phase with respect to the input alternating current. When an alternating current of a frequency above the certain frequency is applied to the bridge input terminals, the resonant arm becomes effectively a capacitor so that an alternating current is produced at the bridge output terminals in such sense as to lead in phase with respect to the input alternating current.

The bridge network forming the subject-matter of this invention is of a type which will produce a transient voltage in response to sudden phase shifts in the voltage applied to the bridge input terminals, which transient voltage is in phase with the steady state output voltage. Such sudden phase shifts may be occasioned, for example, by a sudden increase in the load applied to the motor which drives the generator of the applied voltage and whose speed is to be controlled as mentioned in my copending application, Serial No. 466,509, relating to a speed control system and filed November 21, 1942. Hence, the cophasal transient and steady state output voltages produce a resultant output voltage which serves to regulate motor speed as explained in my copending application, supra.

A feature of the invention is that the frequency discriminating bridge network provides substantially maximum sensitivity with substantially reduced bulk and weight. Both the latter are achieved by an inductance having a molybdenum permalloy dust core which is relatively small in both weight and size, such inductance occupying a volume in one case, by way of example, of the order of one cubic inch with correspondingly reduced weight. Another feature relates to compensation for bridge unbalance occasioned by variations in the direct current resistance of the resonant arm due to variations in ambient temperature. A further feature involves attenuating harmonics in the reference voltage. Still another feature pertains to the introduction of an approximately 90-degree phase shift between the input and output voltages of the frequency discriminating bridge network to compensate for the approximately 90-degree phase inherent in the latter network. A still further feature is a bridge embodying three physical arms, two of which are inductively coupled by having individual windings applied to a common core, which provides an output which is substantially twice the output of a bridge embodying four physical arms, including the transient output. An important advantage of the bridge of three physical arms, aside from the doubled output, is that balance during manufacture may be expeditiously obtained by adjusting the number of turns in the winding of one of the two arms coupled inductively on the common core.

The invention will be readily understood from the following description taken together with the accompanying drawings in which:

Fig. 1A is a schematic circuit diagram showing a specific embodiment of the invention in a four-arm Wheatstone bridge;

Figs. 1B, 1C, and 1D are schematic circuit diagrams showing Fig. 1A in simplified forms in response to certain action therein;

Figs. 2 and 3 are curves illustrating certain action in Figs. 1A, 8, 9, 10 and 11;

Figs. 4, 5, 6 and 7 are vectorial representations of certain action in Figs. 1A, 8, 9, 10 and 11;

The same reference numerals are employed to designate identical elements appearing in the several figures of the drawings.

Figure 8:
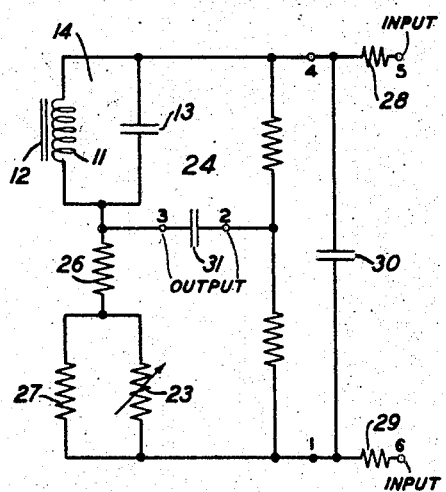
Fig. 8 is a schematic circuit diagram showing a modification of Fig. 1A.

Referring to Fig. 1A, a Wheatstone bridge 10 comprises input terminals 1 and 4 across which is applied a source, not shown, of an electrical voltage variable as to both frequency and phase, output terminals 2 and 3; an electrical winding 11 applied to a core 12 to constitute an inductance which together with a capacitor 13 forms a resonant arm 14 tuned to a certain frequency $f_0$, and individual equal resistors 15 in each of the remaining three arms.

A qualitative analysis of the operation of Fig. 1A shows that when an electrical voltage of the certain frequency $f_0$ is applied to the input terminals 1 and 4, the resonant arm 14 possesses effectively a resistance value equal to that of each of individual resistors 15. As the amounts of resistance in all four arms of the bridge 10 are now equal, the bridge 10 is effectively balanced from an electrical standpoint so that no output voltage is produced across the output terminals 2 and 3. In this condition, the bridge of Fig. 1A may be simplified in an electrical sense as illustrated in Fig. 1B. When the frequency of the voltage applied to the input terminals 1 and 4 is slightly lower than the certain frequency $f_0$, the resonant arm 14 possesses an inductive component 17 as the current of the winding 11 exceeds the current of the capacitor 13. Now, the bridge of Fig. 1A may be simplified in an electrical sense as illustrated in Fig. 1C. As a consequence, a small amount of voltage is produced across the output terminals 2 and 3 in such sense as to lag in phase by 90 degrees the voltage applied to the input terminals 1 and 4.

When the frequency of the voltage applied to the input terminals 1 and 4 is slightly higher than the certain frequency $f_0$, the resonant arm possesses a capacitive component 18, as the current of the capacitor 13 exceeds the current of the winding 11. Now, the bridge of Fig. 1A may be simplified in an electrical sense as illustrated in Fig. 1D. Hence, a small amount of voltage is produced across the output terminals 2 and 3 in such sense as to lead in phase by 90 degrees the voltage applied to the input terminals 1 and 4. As the inphase components of voltage balance out in Fig. 1A, a small resultant electromotive force occurs across the bridge output terminals 2 and 3 in such sense as to lag or lead by 90 degrees the phase of the voltage applied to the bridge input terminals 1 and 4. This action of Figs. 1B, 1C and 1D is illustrated in the curves of Figs. 2 and 3; and is further represented by the vectors of Figs. 4, 5 and 6, respectively.

A quantitative analysis of the operation of Fig. 1A is as follows:

Let $E_{1-4} = E_0 \sin \omega t$

Let $\omega = 2\pi f$, where $f$ is the frequency of the voltage applied to the input terminals 1—4;

Let $\omega_0 = 2\pi f_0$ where $f_0$ is the frequency to which the resonant arm 14 is tuned;

Then, $$\omega_0 L = \frac{1}{\omega_0 C}$$

and $\omega_0^2 LC = 1$, where L is the inductance of the winding 11;

Let $r$ be the series effective resistance of the winding 11;

Let $q$ be the ratio $$\frac{\omega_0 L}{r}$$

which is $\gg 1$, and $$\frac{1}{q^2}$$

is thus negligible.

For some frequency $\omega = \omega_0 + \Delta\omega$ where $\Delta\omega$ is small so that the phase angle but not the magnitude of the current through the lower left arm of the bridge in Fig. 1A changes, it can be readily shown that the voltage existing across terminals 2, 3 of the bridge is $$E_{2-3} = Eq\frac{\Delta\omega}{\omega_0} \cos \omega t \qquad (1)$$

This expression represents the steady state condition corresponding to a slight departure from the frequency at which the bridge is balanced.

If there is a sudden shift in phase of the voltage applied to the input terminals 1, 4 of the bridge, a transient voltage will also appear across bridge terminals 2, 3 due to the stored energy in the resonant arm 14. This may arise from a sudden change in mechanical load or line voltage, for example. Such transient will have a magnitude dependent upon the time in which the sudden phase shift occurs, and its magnitude will be greater as the time is shorter, and will die out exponentially in a very short time. The general form of expression for the transient current is:

$$i_L = \frac{E_0}{2R}(\sin \omega_0 t - q \cos \omega_0 t) +$$

$$A\epsilon^{-\frac{r}{L}t} \cos \omega_0 t + B\epsilon^{-\frac{r}{L}t} \sin \omega_0 t \qquad (2)$$

To determine the constants A and B it is necessary to consider the physical conditions of the circuit. Let it be assumed that, when $t=0$, the phase of the voltage impressed on the bridge input terminals 1 and 4 is instantaneously shifted by an angle $\varphi$, due to a sudden mechanical load being clutched to the motor which was previously identified and whose speed is being regulated according to my copending application, supra.

Then, the prior value of $i_L$ was $$i_L = \frac{E_0}{2R}[\sin(\omega_0 t + \phi) - q\cos(\omega_0 t + \phi)] \quad (3)$$

Now, we know that the tuned circuit 14 in Fig. 1A contains stored energy $\frac{1}{2}Li_L^2 + \frac{1}{2}CE_0^2$ which energy takes a finite time to change when a limited amount of power which has to pass through the lower left resistance arm 15 is supplied thereto. We are therefore justified in assuming that at the instant $t=0$ when the phase shift $\varphi$ is made and also for a quarter cycle later when $$t = \frac{\pi}{2\omega_0}$$

that the current $i_L$ remains substantially at the old value given by Equation 3.

Substituting $t=0$ in Equation 3 gives $$i_L = \frac{E_0}{2R}(\sin\phi - q\cos\phi)$$

Putting this value for $i_L$ in Equation 2 and putting $t=0$, gives $$A = \frac{E_0}{2R}(q + \sin\phi - q\cos\phi)$$

Likewise, when $$t = \frac{\pi}{2\omega_0}$$

the value of $i_L$ from Equations 3 and 2 gives $$i_L = \frac{E_0}{2R}\left[\sin\left(\frac{\pi}{2}+\phi\right) - q\cos\left(\frac{\pi}{2}+\phi\right)\right] = \frac{E_0}{2R} + B\epsilon^{-\frac{\pi}{2q}}$$

whence $$B = \frac{E_0}{2R}\epsilon^{\frac{\pi}{2q}}[\cos\phi + q\sin\phi - 1]$$

It will be noted that if $\varphi$ is zero, then A and B become zero and there is no transient term in Equation 2. However, if $\varphi$ is small but not zero, then $$A = \frac{E_0}{2R}\sin\phi, \text{ and } B = \frac{qE_0}{2R}\epsilon^{\frac{\pi}{2q}}\sin\phi$$

The ratio of $$\frac{B}{A} = q\epsilon^{\frac{\pi}{2q}}$$

But $$\epsilon^{\frac{\pi}{2q}} > 1, \text{ and } q \gg 1.$$

Therefore, A may be neglected relative to B, and if $q$ is large we can put $$\epsilon^{\frac{\pi}{2q}} = 1$$

which makes $$B = \frac{qE_0}{2R}\sin\phi$$

and Equation 2 becomes $$i_L = \frac{E_0}{2R}(\sin\omega_0 t - q\cos\omega_0 t) + \frac{qE_0}{2R}\sin\phi\,\epsilon^{-\frac{r}{L}t}\sin\omega_0 t \quad (4)$$

The voltage $E_{3-4}$ across the inductance 11 is $$ri_L + L\frac{di_L}{dt}$$

In order to derive the bridge output voltage $E_{2-3}$ in the proper polarity it is necessary to follow exactly the same procedure used in deriving the steady state voltage as per Equation 1, i. e. we take $E_{2-3}$ as $E_{1-3} - E_{1-2}$. But $E_{1-3} = E_{1-4} - E_{3-4}$ $$E_{1-3} = E_0\sin\omega_0 t - ri_L - L\frac{di_L}{dt}$$

Hence $$E_{2-3} = E_{1-3} - E_{1-2} = E_0\sin\omega_0 t - ri_L - L\frac{di_L}{dt} - \frac{E_0}{2}\sin\omega_0$$

Substituting the values for $i_L$ and $$\frac{di_L}{dt}$$

from Equation 4 the value of $E_{2-3}$ will simplify to $$E_{2-3} = -\frac{E_0}{2}\sin\phi\,\epsilon^{-\frac{r}{L}t}\cos\omega_0 t \quad (5)$$

(When making these substitutions put $$R = q^2 r \text{ and } \frac{1}{q^2} = 0)$$

This result when compared with that of Equation 1 yields the following conclusion which has important practical value, i. e.: The bridge in Fig. 1A yields a transient voltage at the bridge output terminals 2—3, which transient voltage is substantially in-phase with the steady state bridge ouput voltage at the output terminals 2—3 and assists the latter to control the motor speed according to my copending application, supra. For example, in the case assumed where a load is suddenly applied to such motor so that the frequency of the voltage $E_{1-4}$ produced by the voltage source driven thereby is caused to fall slightly below the frequency to which resonant arm 14 is tuned, $$\frac{\Delta\omega}{\omega_0}$$

is negative in Equation 1. In Equation 5 the phase angle $\varphi$ is positive so that Equations 1 and 5 are cumulative. It will also be noted that the transient voltage in Equation 5 has a relatively large initial value which assists stabilization by overcoming time lags elsewhere in the speed regulator system according to my copending application, supra.

For example, suppose the phase angle $\varphi$ is 25 degrees; then from Equation 5 the initial value of the transient voltage will be $.21E_0$. A tenth of one per cent change in speed on a steady state basis from Equation 1 with a coil having a $q=20$, gives $.02E_0$. In other words, the initial value of the transient effect is ten times that of the steady state effect for the conditions assumed. The transient however lasts only a few milliseconds since $$\frac{r}{L} = 200$$

in the specific case supposed above. This is desirable as it provides a large initial corrective force for any change affecting the phase of the applied bridge voltage. Due to its short duration, there is no tendency to overcorrection and the result is both fast and stable regulation of the motor speed according to my copending application, supra.

The Equation 5 for the transient output voltage may be derived vectorially in Fig. 7 with respect to Fig. 1A. Suppose the bridge 10, Fig. 1A, had been operating under a steady condition with a phase angle $\varphi$ ahead of its new position, that is, with the voltages $E_{1-4}$ and $E_{2-4}$ shown by the broken line vectors. Then, the voltage $E_{11}$ across the inductance 11 would be as shown in full lines in Fig. 7, and there would be no resultant difference between the voltage $E_{2-4}$ across the terminals 2 and 4 and the voltage $E_{11}$. If now the input voltage $E_{1-4}$, and with it the voltage $E_{2-4}$, were suddenly shifted back by an angle $\varphi$ to the full line position shown in Fig. 7 while the voltage $E_{11}$, due to energy storage in the inductance 11 and capacitor 13, as above explained, does not move with it for several cycles, as indicated by its full line position in Fig. 7, then a resultant $E_{2-3}$ will appear at the output terminals 2—3 and persist thereat a few cycles in accordance with Equation 5, the phase of the voltage $E_{11}$ finally resuming its ultimate position of 180 degrees from $E_{1-4}$ or $E_0$ as shown by its broken line position in Fig. 7. It will be noted that the resultant vector $E_{2-3}$, Fig. 7, agrees with Equation 5. The initial value of $E_{2-3}$ is equal to $E_{2-4} \sin \varphi$, and the phase of $E_{2-3}$ is at right angles to $E_{1-4}$. A sudden decrease in the motor load would cause the occurrence of opposite speed and transient effects.

The foregoing analysis of the circuit of Fig. 1A with respect to both steady state and transient conditions, and the quantitative results shown by the calculations indicate advantageous performance to be sought in a proper and suitable embodiment. One form of such embodiment for securing these advantages, in accordance with the present invention, will now be described. Substantially maximum sensitivity with substantially maximum-minimum bulk and weight is achieved by utilizing in the resonant arm 14 an inductance having a core 12 of molybdenum permalloy dust. In one example, such an inductance occupied only about one cubic inch of space with correspondingly small weight. This inductance possesses a satisfactory $q$ of the order of 20 at a frequency of 720 cycles per second, which for this illustration is the frequency to which the resonant arm, Fig. 1A, is tuned, due to its high magnetic permeability. Such inductance is also stable as to its inductive characteristic with respect to temperature variations, as the core 12 is treated substantially as disclosed in the patent of V. E. Legg, No. 2,158,132, granted May 16, 1939.

In designing an inductance comprising the winding 11 on the core 12, Fig. 1A, there is frequently an optimum value of $q$ for any given set of conditions. Although Equation 1 shows that the bridge output, Fig. 1A, is increased the higher the value of $q$, there is a limit in cases involving speed control circuits of the type disclosed in my copending application, supra, beyond which limit it is undesirable to go. Referring to the wide range frequency characteristics, Figs. 2 and 3, there is a limited frequency band width within which the proper phase relations for the output voltage $E_{2-3}$ will hold. If the value of $q$ were too high, this band width may be so narrow that the motor would not attain a speed corresponding to the equilibrium frequency, $f_0$, but would either stop accelerating before the speed corresponding to such equilibrium frequency $f_0$ were reached, or run through the speed corresponding to such equilibrium frequency $f_0$. It was found that the value of $q$ should be such that the bridge 10, Fig. 1A, maintains substantially the proper phase relations for the voltage $E_{2-3}$ over a band width of $\pm 20$ per cent of the equilibrium frequency $f_0$, Fig. 2.

It is also apparent from Equation 1 that the applied bridge voltage, Fig. 1A, should be a maximum consistent with the flux density limits of the inductance comprising the winding 11 on the core 12, and the power consumption of the circuit. Since amplification by vacuum tubes is relatively inexpensive, the limitation on bridge output is fixed by the ratio of the input voltage to extraneous voltages which may be due to imperfect bridge balance, or harmonics present in the input voltage, or harmonics generated in the inductance by magnetic saturation.

Consider first the aspect of bridge balance in Fig. 1A in which the effect of ambient temperature variations on the bridge 10 is such as to vary the effective resistance value of the winding 11 due to changes in the effective direct current resistance value of the inductance constituting the resonant arm 14. In effect, the winding 11 may be deemed to possess a positive temperature coefficient of resistance. This varies the effective parallel resistance of the resonant arm 14, and, consequently, the bridge 10 of Fig. 1A can be accurately balanced at the certain frequency $f_0$ only over a limited temperature range. Compensation for such resistance variation is accomplished by introducing a thermistor 23 in the lower left arm of the bridge 24 as shown in Fig. 8. The lower left arm in Fig. 8 now comprises a resistor 26 disposed in series with a resistor 27 and the thermistor 23 in parallel. The thermistor 23 has a preselected negative temperature coefficient of resistance to vary the effective resistance of the lower left arm in a sense such that the effect of the positive temperature coefficient of resistance of the winding of 11 is compensated for over a certain range of variation of ambient temperature. This means that the bridge arm 14 of Fig. 1A remains substantially balanced at the frequency $f_0$ over the certain range of ambient temperature variation. The thermistor 23 is preferaly located adjacent the winding 11 so that both thereof are continuously exposed substantially to the same range of variations of ambient temperature. In other respects, the bridge 24 of Fig. 8 functions substantially identically with the bridge 10 of Fig. 1A.

Considering next the aspect of bridge balance in Fig. 1A in which the presence of a small percentage of harmonics of the voltage applied to the input voltage $E_{1-4}$ would cause the occurrence of an output voltage $E_{2-3}$, even though the input voltage $E_{1-4}$ contained the frequency $f_0$, and therefore theoretically the bridge 10 should be substantially balanced. For example, if the voltage $E_{1-4}$ has 5 per cent of such harmonics, these harmonics would appear only slightly attenuated in the output voltage $E_{2-3}$, as capacitor 13 would offer small impedance to such harmonics, and the bridge 10 would be far off balance for harmonics. On the other hand, for the frequency $f_0$ to which the resonant arm 15 is tuned, the bridge 10 would be substantially balanced so that if $$\frac{\Delta \omega}{\omega_0} = \tfrac{1}{10} \text{ of } 1\% \text{ and } q = 20$$

the useful output of the bridge will be $$E_{2-3} = jE_{1-4}\, q\frac{\Delta \omega}{\omega_0} = jE_{1-4}(20)(\tfrac{1}{10})(\tfrac{1}{100})$$

$$E_{2-3} = j.02 E_{1-4}$$

If the magnitude of the harmonic voltage at the output terminals 2 and 3 is half of that at the input terminals 1 and 4, these harmonics will be ½ of 5%=$.025E_{1-4}$, or a little greater than the useful signal at the output terminals 2 and 3, Fig. 1A. The presence of such large amounts of harmonics in the output of the bridge 10, Fig. 1A, will usually interfere with proper performance of a circuit which is to be regulated exclusively in response to variations in the frequency of the input voltage $E_{1-4}$ with reference to the frequency $f_0$ as pointed out in my copending application, supra.

To control the magnitude of the aforementioned harmonics present in the input voltage $E_{1-4}$, a filter comprising resistors 28 and 29 and capacitors 30 and 31, all of which are made of physically small and inexpensive units, is applied to the bridge input terminals 1 and 4 and bridge output terminals 2 and 3 as indicated in Fig. 8. Thus, the resistor 28 is in series with terminal 4; resistor 29 is in series with terminal 1, capacitor 30 is in shunt of both these terminals and capacitor 31 is across output terminals 2 and 3. In this connection the input voltage $E_{1-4}$ is supplied to input terminals 5 and 6. This filter serves two important purposes: (1) to attenuate harmonics present in the voltage, $E_{1-4}$, one stage being provided by the capacitor 30 together with resistors 28 and 29, and another stage being provided by capacitor 31, operating against the internal resistance of the bridge 24; and (2) to provide a compensating phase shift of approximately 90 degrees between the input and output voltages of the bridge 24 so as to offset the approximate 90 degree internal shift inherent in the bridge 24 as shown by Equation 1. By such filter means the bridge output voltage $E_{2-3}$ is rendered in-phase with the voltage applied to the input terminals 5 and 6. This phase characteristic, Fig. 8, and the compensation therefor are important when it is desired to translate the alternating output voltage $E_{2-3}$ into a direct current voltage in the manner pointed out in my copending application, supra.

Figure 9:
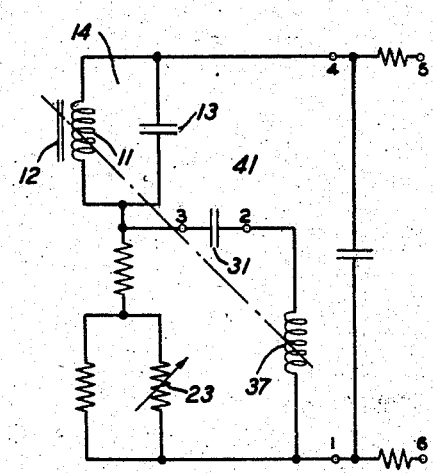
Fig. 9 is a schematic circuit diagram showing a modification of Fig. 8.
Figure 10:
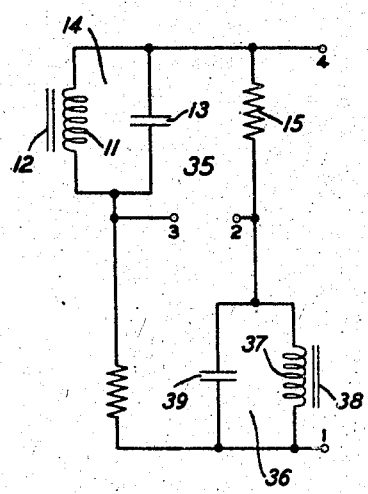
Fig. 10 is a schematic circuit diagram of a further modification of Fig. 1A.

Another embodiment of the invention is shown in Fig. 9 in which approximately twice the output voltage $E_{2-3}$ of Figs. 1A or 8 is obtained. In an electrical sense the devices of Figs. 8 and 9 are identical as it will now be pointed out. It will be evident from Fig. 1A that if an additional tuned circuit, exactly like the tuned arm 14, were substituted in the lower right arm of Fig. 1A that the bridge output for a given frequency change would be substantially doubled. In this connection Fig. 10 shows, in the upper left arm of a Wheatstone bridge 35, the winding 11 applied to the core 12 and connected in parallel with the capacitor 13 to constitute the resonant arm 14 shown and described above concerning Fig. 1A. In the lower right arm of the bridge 35, Fig. 10, is interposed a resonant arm 36 comprising winding 37 applied to core 38 and disposed in parallel with a capacitor 39. As the resonant arms 14 and 36 are substantially symmetrical, the core 38 may be omitted from the resonant arm 36 and the winding 37 thereon applied to the core 12 of the resonant arm 14. At the same time, the upper right hand resistance arm 15, Fig. 10, and the capacitor 39 of the resonant arm 36, Fig. 10, may be both omitted as the electrical equivalents of these elements will be effectively provided by the transformer action between the coupled windings 11 and 37 on the common core 12. This results in bridge 40 shown in Fig. 11, which latter bridge is the electrical equivalent of bridge 10, Fig. 1A. This bridge 40 may be further modified to embody the filter and phase network of Fig. 8, as explained above, and therefore may be represented by the bridge 41 in Fig. 9 which provides twice the output of Fig. 1A as previously mentioned. In all electrical respects, the bridge 41, Fig. 9, is equivalent to the bridges 10 and 24, Figs. 1A and 8, respectively. The coil embodying the windings 11 and 37 applied to the common core 12, Fig. 9, is not appreciably larger in size than the coil comprising only the individual winding 11 on the core 12, Fig. 1A, as the winding 37 may be of fine wire since it carries no current.

Figure 11:
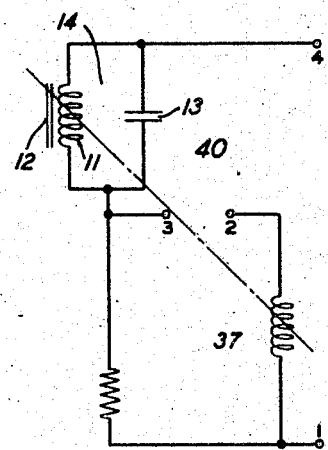
Fig. 11 is a schematic circuit diagram showing a modification of Fig. 10.

An important feature of the bridges 40 and 41 shown in Figs. 9 and 11 is that balance may be expeditiously obtained in the shop during manufacture by adjusting but one side of the bridges 40 and 41, whereas in the case of the bridges 10, 31 and 35, Figs. 1A, 8 and 10, respectively, all arms must be precisely balanced in order to effect bridge balance. The adjustment procedure for balancing Figs. 9 and 11 is to vary the number of turns of winding 11 on core 12 until the arm 14 is tuned precisely to the frequency $f_0$ so that the arm 14 possesses a predetermined effective impedance at the latter frequency. Then, with the voltage of frequency $f_0$ impressed on bridge input terminals 1 and 4, a variably calibrated resistor is substituted in the lower left arm 1—3, and adjusted until the voltage at the bridge output terminals 2 and 3 is substantially zero. The calibrated resistor is then replaced by a permanent thermistor network of substantially the same resistance value at the ambient temperature at which the adjustable resistor was used. This means that the effective impedance of the lower left arm 1—3 at the frequency $f_0$ approximates the effective impedance of the arm 14 at the frequency $f_0$. This method of adjustment permits liberal manufacturing tolerances with reference to the values of the capacitance of the capacitor 13 and number of turns of the winding 11, and further gives precise over-all bridge balance. It should be noted that no exact turns ratio between windings 11 and 37 is required, since a variation of the turns of the winding 37, for example, merely alters the value of the effective impedance of the resistance arm 1—3.

What is claimed is:

1. A Wheatstone bridge having in a first arm an electrical winding, a capacitor, and a magnetic core for said winding, said first arm being tuned to a certain frequency, in a second arm a resistive network, in a third arm a further electrical winding on said core and coupled inductively to said first winding, in a fourth arm the effective mutual inductance between said windings on said core, a pair of input terminals constituted by a terminal of said first arm and the junction point between said second and third arms, and a pair of output terminals constituted by the other end of said third arm and the junction point between said first and second arms, said bridge having a balanced condition when electrical energy having the certain frequency is applied to said input terminal pair so that substantially none of the applied input energy appears at said output terminal pair, and having an unbalanced condition when electrical energy having a frequency different from the certain frequency is supplied to said input terminal pair so that some of the latter energy appears at said output terminal pair.

2. A bridge according to claim 1 in which said winding of said first arm tends to change its effective resistance with variations in ambient temperature over a certain range and thereby tends to unbalance said bridge although electrical energy of the certain frequency is applied to said input terminal pair, and in which said resistive network of said second arm includes a resistive element having a preselected temperature coefficient of resistance of such magnitude and sign that the effective resistance of said second arm tends to compensate for the changes in the effective resistance of said first arm during the certain ambient temperature variation and thereby tends to maintain the balanced condition in said bridge.

3. The apparatus according to claim 1 in which said core is composed of molybdenum-permalloy dust so that said apparatus possesses substantially reduced bulk and weight.

4. A bridge according to claim 1, said bridge possessing an inherent phase characteristic tending to introduce a phase shift in the electrical energy supplied to said output terminal pair when the bridge is unbalanced, said bridge including a frequency-selective network applied effectively to both said input and output terminal pairs and cooperating with the effective internal resistance of said bridge for substantially attenuating harmonics that may be present in the electrical energy applied to said input terminal pair, said network having a phase characteristic such as to compensate for the phase characteristic of said bridge.

5. A frequency discriminating network comprising a Wheatstone bridge having a pair of input terminals and a pair of output terminals, a resonant arm comprising an inductance and capacity connected between an input terminal and an output terminal, a resistance arm connected between said output terminal and the other input terminal, and an inductance arm connected between said last-mentioned input terminal and the remaining output terminal and closely coupled inductively to said first-mentioned inductance, the remaining arm of said bridge comprising the mutual inductance between said last two coupled inductances.

HUGH M. STOLLER.